United States Patent
He et al.

(10) Patent No.: US 12,333,837 B2
(45) Date of Patent: Jun. 17, 2025

(54) METHOD FOR TRAINING IMAGE-TEXT MATCHING MODEL, COMPUTING DEVICE, AND STORAGE MEDIUM

(71) Applicant: BEIJING BAIDU NETCOM SCIENCE TECHNOLOGY CO., LTD., Beijing (CN)

(72) Inventors: Feng He, Beijing (CN); Qi Wang, Beijing (CN); Hu Yang, Beijing (CN); Shuai Chen, Beijing (CN); Zhifan Feng, Beijing (CN); Chunguang Chai, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 443 days.

(21) Appl. No.: 17/943,458

(22) Filed: Sep. 13, 2022

(65) Prior Publication Data

US 2023/0005284 A1    Jan. 5, 2023

(30) Foreign Application Priority Data

Sep. 18, 2021 (CN) .......................... 202111101658.8

(51) Int. Cl.
G06V 30/194    (2022.01)
G06F 16/583    (2019.01)
G06V 30/19    (2022.01)

(52) U.S. Cl.
CPC ...... *G06V 30/19147* (2022.01); *G06F 16/583* (2019.01); *G06V 30/1916* (2022.01)

(58) Field of Classification Search
CPC .................. G06F 16/50–587; G06V 30/00–43
See application file for complete search history.

(56) References Cited

U.S. PATENT DOCUMENTS

2019/0130231 A1* 5/2019 Liu .................... G06N 3/045
2020/0380298 A1  12/2020 Aggarwal et al.
(Continued)

FOREIGN PATENT DOCUMENTS

CN    112257452 A      1/2021
CN    112650867 A  *  4/2021  ........... G06F 16/535
(Continued)

OTHER PUBLICATIONS

Li et al., "Fast Image Retrieval Based on Hash Algorithm in Depth Learning," vol. 47, No. 12, pp. 3187-3192, Guangdong Innovative Technical College, Dongguan, China (2019).
(Continued)

*Primary Examiner* — Sean T Motsinger
(74) *Attorney, Agent, or Firm* — Leydig, Voit & Mayer, Ltd.

(57) ABSTRACT

A computer-implemented method is provided. The method includes: obtaining a sample text and a sample image corresponding to the sample text; labeling a true semantic tag for the sample text according to a first preset rule; obtaining a text feature representation of the sample text and a predicted semantic tag output by a text coding sub-model; obtaining an image feature representation of the sample image output by an image coding sub-model; calculating a first loss based on the true semantic tag and the predicted semantic tag; calculating a contrast loss based on the text feature representation of the sample text and the image feature representation of the sample image; adjusting parameters of the text coding sub-model based on the first loss and the contrast loss; and adjusting parameters of the image coding sub-model based on the contrast loss.

17 Claims, 6 Drawing Sheets

(56) References Cited

U.S. PATENT DOCUMENTS

2022/0335216 A1* 10/2022 Ren .................... G06F 40/279
2023/0005284 A1* 1/2023 He .................. G06V 30/19147

FOREIGN PATENT DOCUMENTS

CN        113360700 A    9/2021
WO     2021042763 A1    3/2021

OTHER PUBLICATIONS

Cheng et al., "Deep attentional fine-grained similarity network with adversarial learning from cross-modal retrieval," Multimedia Tools and Applications pp. 31401-31428 (Aug. 20, 2020).

\* cited by examiner

METHOD FOR TRAINING IMAGE-TEXT MATCHING MODEL, COMPUTING DEVICE, AND STORAGE MEDIUM

CROSS REFERENCE TO RELATED APPLICATIONS

This application claims priority to Chinese patent application No. 202111101658.8, filed on Sep. 18, 2021, the contents of which are hereby incorporated by reference in their entirety for all purposes.

TECHNICAL FIELD

The present disclosure relates to the field of artificial intelligence, in particular to the technical fields of knowledge mapping and deep learning, and specifically relates to a method training for an image-text matching model, a method for realizing image-text retrieval, a computing device and a computer readable storage medium.

BACKGROUND

Artificial intelligence is a discipline of making computers to simulate certain thinking processes and intelligent behaviors of people (such as learning, reasoning, thinking, planning, etc.), involving both hardware-level technologies and software-level technologies. Artificial intelligence hardware technologies generally include technologies such as sensors, dedicated artificial intelligence chips, cloud computing, distributed storage, and big data processing. Artificial intelligence software technologies mainly include computer vision technology, speech recognition technology, natural language processing technology, machine learning/deep learning, big data processing technology, knowledge mapping technology and other major directions.

With the development of Internet technology, the number of images on the Internet has been rising explosively. As an information carrier, images play an important role in people's daily life and work. People often need to retrieve desired images through texts.

Approaches described in this section are not necessarily approaches that have been previously conceived or employed. Unless otherwise indicated, it should not be assumed that any of the approaches described in this section qualify as prior art merely by virtue of their inclusion in this section. Similarly, unless otherwise indicated, issues mentioned in this section should not be considered to be recognized in any prior art.

SUMMARY

The present disclosure provides a method for training an image-text matching model, a computing device and a computer readable storage medium.

According to one aspect of the present disclosure, a computer-implemented method is provided. The method includes: obtaining a sample text and a sample image corresponding to the sample text; labeling a true semantic tag for the sample text according to a first preset rule; inputting the sample text into a text coding sub-model of an image-text matching model, and obtaining a text feature representation of the sample text and a predicted semantic tag output by the text coding sub-model; inputting the sample image into an image coding sub-model of the image-text matching model, and obtaining an image feature representation of the sample image output by the image coding sub-model; calculating a first loss based on the true semantic tag and the predicted semantic tag; calculating a contrast loss based on the text feature representation of the sample text and the image feature representation of the sample image; adjusting one or more parameters of the text coding sub-model based on the first loss and the contrast loss; and adjusting one or more parameters of the image coding sub-model based on the contrast loss.

According to another aspect of the present disclosure, a computing device is provided, and includes: one or more processors; and a memory storing one or more programs configured to be executed by the one or more processors, the one or more programs comprising instructions for performing operations comprising: obtaining a sample text and a sample image corresponding to the sample text; labeling a true semantic tag for the sample text according to a first preset rule; inputting the sample text into a text coding sub-model of an image-text matching model, and obtaining a text feature representation of the sample text and a predicted semantic tag output by the text coding sub-model; inputting the sample image into an image coding sub-model of the image-text matching model, and obtaining an image feature representation of the sample image output by the image coding sub-model; calculating a first loss function based on the true semantic tag and the predicted semantic tag; calculating a contrast loss function based on the text feature representation of the sample text and the image feature representation of the sample image; adjusting one or more parameters of the text coding sub-model based on the first loss function and the contrast loss function; and adjusting one or more parameters of the image coding sub-model based on the contrast loss.

According to another aspect of the present disclosure, a non-transitory computer readable storage medium is provided. The non-transitory computer-readable storage medium storing one or more programs comprising instructions that, when executed by one or more processors of a computing device, cause the computing device to perform operations comprising: obtaining a sample text and a sample image corresponding to the sample text; labeling a true semantic tag for the sample text according to a first preset rule; inputting the sample text into a text coding sub-model of an image-text matching model, and obtaining a text feature representation of the sample text and a predicted semantic tag output by the text coding sub-model; inputting the sample image into an image coding sub-model of the image-text matching model, and obtaining an image feature representation of the sample image output by the image coding sub-model; calculating a first loss based on the true semantic tag and the predicted semantic tag; calculating a contrast loss based on the text feature representation of the sample text and the image feature representation of the sample image; adjusting one or more parameters of the text coding sub-model based on the first loss and the contrast loss; and adjusting one or more parameters of the image coding sub-model based on the contrast loss.

It should be understood that, content described in this section is not intended to identify key or critical features of the embodiments of the present disclosure, nor is it used for limiting the scope of the present disclosure. Other features of the present disclosure will become readily understood through the following description.

BRIEF DESCRIPTIONS OF THE DRAWINGS

The accompanying drawings exemplarily illustrate embodiments and constitute a part of the specification, and together with the written description of the specification serve to explain exemplary implementations of the embodiments. The shown embodiments are for illustrative purposes only and do not limit the scope of the claims. Throughout the drawings, the same reference numbers refer to similar but not necessarily identical elements.

DETAILED DESCRIPTION

Embodiments of the present disclosure are described below with reference to the accompanying drawings, which include various details of the embodiments of the present disclosure to facilitate understanding and should be considered as exemplary only. Accordingly, those of ordinary skill in the art should realize that various changes and modifications can be made to the embodiments described herein without departing from the scope of the present disclosure. Also, descriptions of well-known functions and constructions are omitted from the following description for clarity and conciseness.

In the present disclosure, unless otherwise specified, the use of the terms "first", "second", etc. to describe various elements is not intended to limit a positional relationship, timing relationship or importance relationship of these elements, and such terms are only used for distinguishing one element from another element. In some examples, a first element and a second element may refer to the same instance of the element, while in some cases they may refer to different instances based on the context of the description.

Terms used in the description of the various described examples in the present disclosure are for the purpose of describing particular examples only and are not intended to be limiting. Unless the context clearly dictates otherwise, if the number of an element is not expressly limited, the element may be one or more. Furthermore, as used in the present disclosure, the term "and/or" covers any and all possible combinations of listed items.

The embodiments of the present disclosure will be described in detail below with reference to the accompanying drawings.

Figure 1:
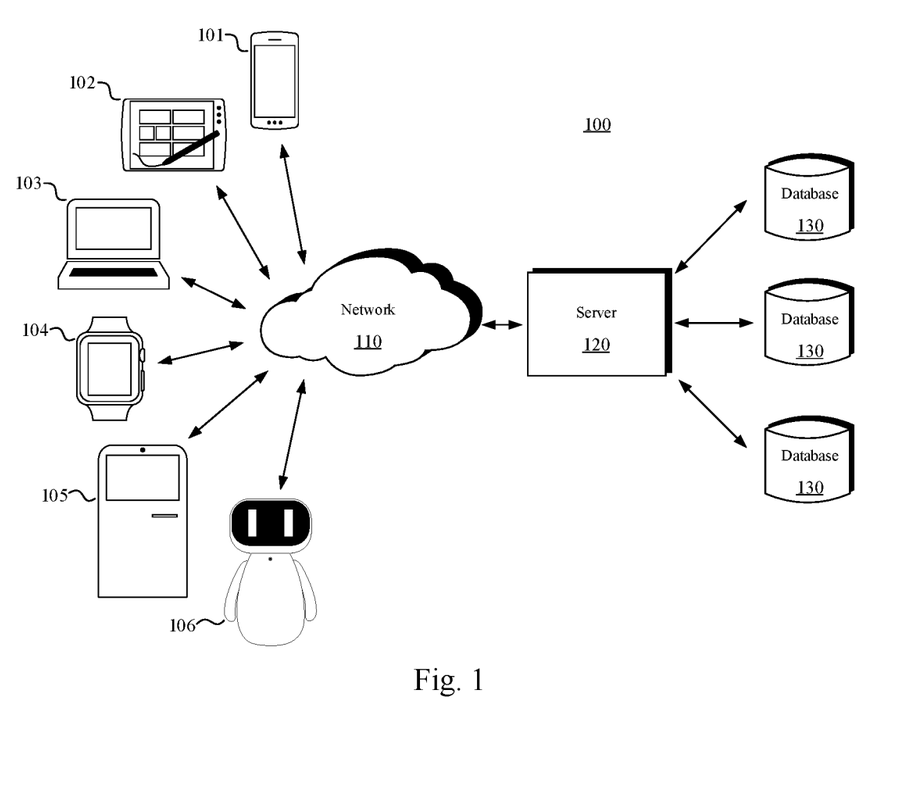
FIG. 1 illustrates a schematic diagram of an example system in which various methods described herein can be implemented according to some embodiments of the present disclosure.

FIG. 1 illustrates a schematic diagram of an exemplary system 100 in which various methods described herein can be implemented according to an embodiment of the present disclosure. With reference to FIG. 1, the system 100 includes one or more client devices 101, 102, 103, 104, 105 and 106, a server 120, and one or more communication networks 110 coupling the one or more client devices to the server 120. The client devices 101, 102, 103, 104, 105, and 106 may be configured to execute one or more application programs.

In the embodiment of the present disclosure, the server 120 may run one or more services or software applications that can execute a method for training an image-text matching model and a method for realizing image-text retrieval by utilizing the image-text matching model.

In some embodiments, the server 120 may further provide other services or software applications including a non-virtual environment and a virtual environment. In some embodiments, these services may be provided as web-based services or cloud services, for example, be provided for a user of the client devices 101, 102, 103, 104, 105, and/or 106 under a software-as-a-service (SaaS) model.

In a configuration shown in FIG. 1, the server 120 may include one or more components that realize a function executed by the server 120. These components may include software components executable by one or more processors, hardware components, or a combination thereof. The user operating the client devices 101, 102, 103, 104, 105, and/or 106 may in turn utilize one or more client application programs to interact with the server 120 so as to utilize services provided by these components. It should be understood that a variety of different system configurations are possible, which may differ from the system 100. Accordingly, FIG. 1 is one example of a system for implementing the various methods described herein, and is not intended to be limiting.

The user may use the client devices 101, 102, 103, 104, 105, and/or 106 to input a text to retrieve a corresponding image. The client devices may provide an interface that enables the user of the client devices to interact with the client devices. The client devices may also output information to the user via the interface. Although FIG. 1 depicts only six types of client devices, those of skill in the art will be able to understand that the present disclosure may support any quantity of client devices.

The client devices 101, 102, 103, 104, 105, and/or 106 may include various types of computer devices, such as portable handheld devices, general purpose computers (such as personal computers and laptop computers), workstation computers, wearable devices, smart screen devices, self-service terminal devices, service robots, gaming systems, thin clients, various messaging devices, sensors or other sensing devices, etc. These computer devices may run various types and versions of software application programs and operating systems, such as MICROSOFT Windows, APPLE iOS, UNIX-like operating systems, and Linux or Linux-like operating systems (such as GOOGLE Chrome OS); or include various mobile operating systems, such as MICROSOFT Windows Mobile OS, iOS, Windows Phone, and Android. The portable handheld devices may include cellular phones, smart phones, tablet computers, personal digital assistants (PDAs), and the like. The wearable devices may include head mounted displays (such as smart glasses) and other devices. The gaming systems may include various handheld gaming devices, Internet-enabled gaming devices, and the like. The client devices can execute a variety of different application programs, such as various Internet-related application programs, communication application programs (e.g., e-mail application programs), and Short Message Service (SMS) application programs, and may use various communication protocols.

A network 110 may be any type of network known to those of skill in the art that may support data communication by using any one of a variety of available protocols (including but not limited to TCP/IP, SNA, IPX, and the like). By way of example only, one or more networks 110 may be a local area network (LAN), an Ethernet-based network, a token ring, a wide area network (WAN), the Internet, a virtual network, a virtual private network (VPN), an intranet, an extranet, a public switched telephone network (PSTN), an infrared network, a wireless network (e.g., Bluetooth and WIFI) and/or any combination of these and/or other networks.

The server 120 may include one or more general purpose computers, special purpose server computers (e.g., PC (personal computer) servers, UNIX servers, and midrange servers), blade servers, mainframe computers, server clusters, or any other suitable arrangement and/or combination. The server 120 may include one or more virtual machines running a virtual operating system, or other computing architecture involving virtualization (e.g., one or more flexible pools of logical storage devices that may be virtualized to maintain the server's virtual storage devices). In various embodiments, the server 120 may run one or more services or software applications that provide the functions described below.

A computing unit in the server 120 may run one or more operating systems including any one of the operating systems described above, as well as any commercially available server operating systems. The server 120 may also run any one of a variety of additional server application programs and/or middle-tier application programs, including HTTP servers, FTP servers, CGI servers, JAVA servers, database servers, etc.

In some embodiments, the server 120 may include one or more application programs, so as to analyze and consolidate data feeds and/or event updates received from the user of the client devices 101, 102, 103, 104, 105, and 106. The server 120 may also include one or more application programs to display the data feeds and/or real-time events via one or more display devices of the client devices 101, 102, 103, 104, 105, and 106.

In some implementation modes, the server 120 may be a server of a distributed system, or a server combined with a blockchain. The server 120 may also be a cloud server, or an intelligent cloud computing server or an intelligent cloud host with artificial intelligence technology. The cloud server is a host product in a cloud computing service system to solve the defects of high management difficulty and weak business expansibility in a traditional physical host and virtual private server (VPS) services.

The system 100 may also include one or more databases 130. In some embodiments, these databases may be used for storing data and other information. For example, one or more of the databases 130 may be used for storing information such as an audio file and an image file. Databases 130 may be resident in various locations. For example, a data storage library used by the server 120 may be located locally in the server 120, or may be away from the server 120 and may communicate with the server 120 based on a network or a dedicated connection. The databases 130 may be of different types. In some embodiments, the data storage library used by the server 120 may be a database, for example, a relationship database. One or more of the databases may respond to a command and store, update and retrieve data of the databases and from the databases.

In some embodiments, one or more of the databases 130 may also be used by an application program to store application program data. The databases used by the application program may be databases of different types, for example, a key-value storage library, an object storage library, or a regular storage library backed by a file system.

The system 100 in FIG. 1 may be configured and operated in various manners, so that it is enabled to apply various methods and apparatus described according to the present disclosure.

Figure 2:
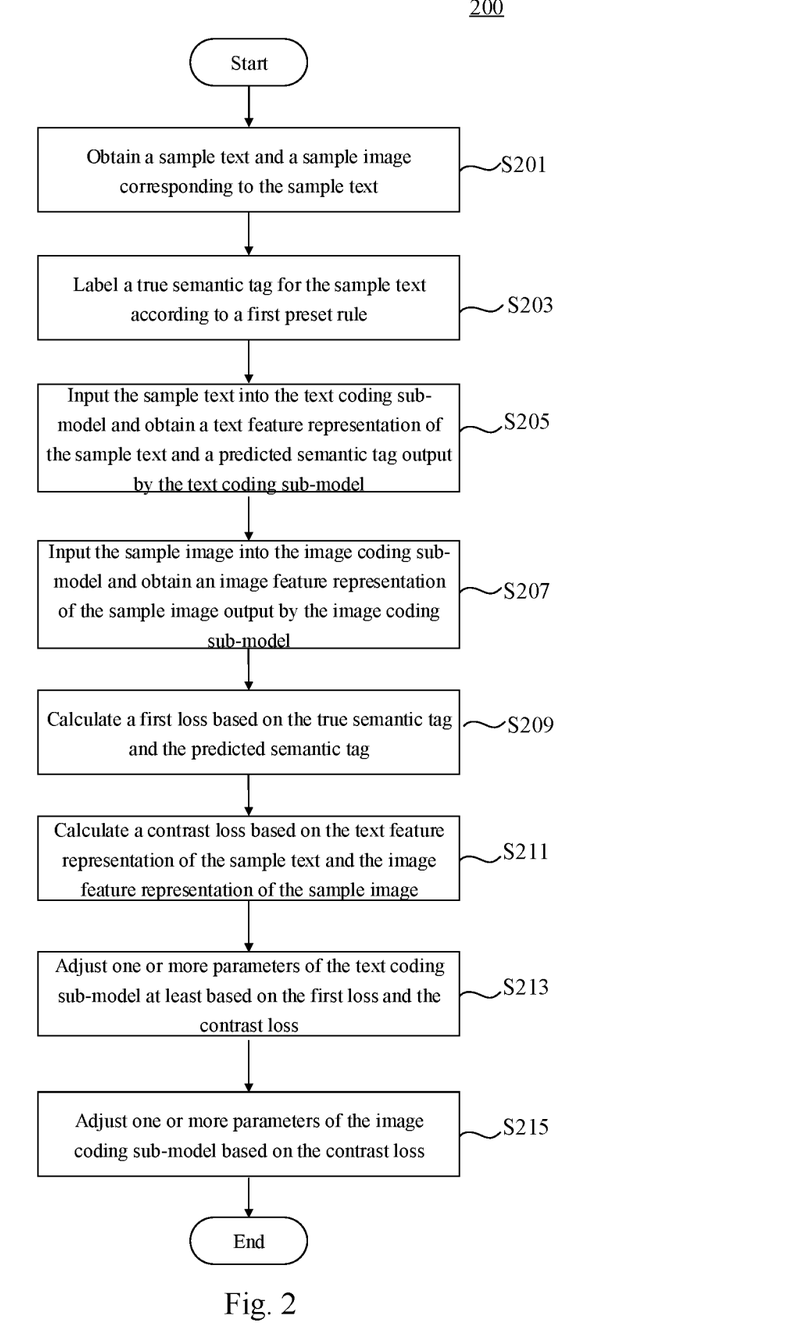
FIG. 2 illustrates a flow chart of a method for training an image-text matching model according to some embodiments of the present disclosure.
Figure 3:
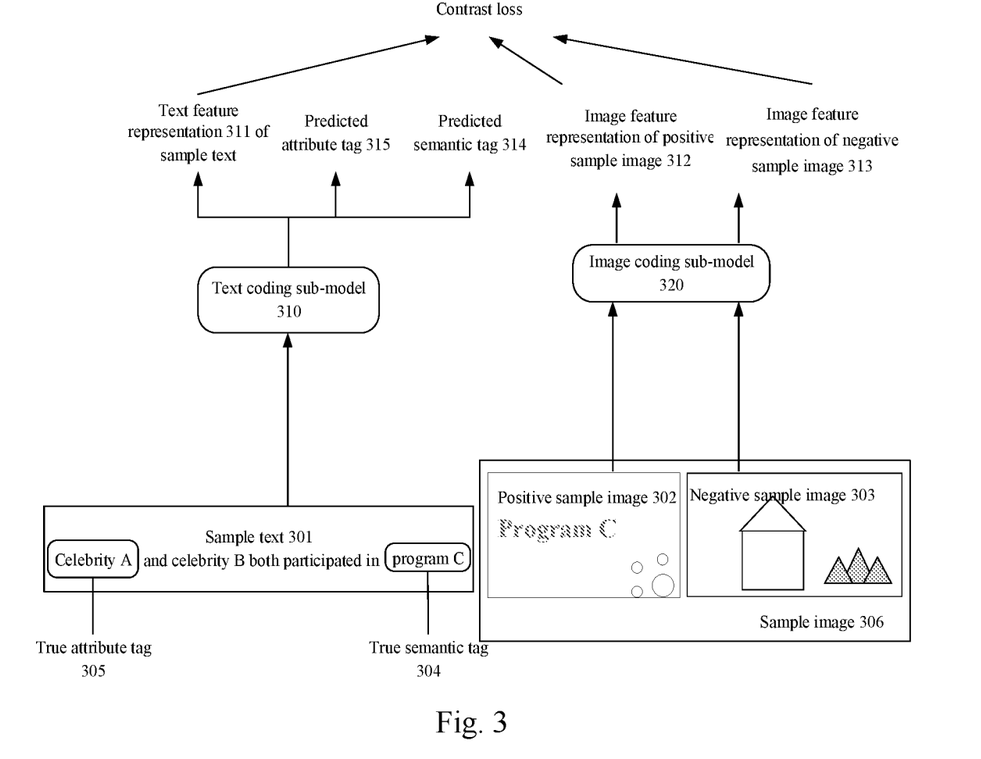
FIG. 3 illustrates a schematic diagram of a principle for training an image-text matching model according to some embodiments of the present disclosure.

FIG. 2 illustrates a flow chart of a method for training an image-text matching model according to some embodiments of the present disclosure. FIG. 3 illustrates a schematic diagram of a principle of training an image-text matching model according to some embodiments of the present disclosure. As shown in FIG. 2 and FIG. 3, the image-text matching model includes a text coding sub-model 310 and an image coding sub-model 320. As shown in FIG. 2, the method 200 includes: step S201, a sample text 301 and a sample image 306 corresponding to the sample text 301 are obtained; step S203, a true semantic tag 304 of the sample text 301 is labeled according to a first preset rule; step S205, the sample text 301 is input into the text coding sub-model 310 so as to obtain text feature representation 311 of the sample text 301 and a predicted semantic tag 314 output by the text coding sub-model 310; step S207, the sample image 306 is input into the image coding sub-model 320 so as to obtain image feature representation of the sample image output by the image coding sub-model 320; step S209, a first loss is calculated based on the true semantic tag 304 and the predicted semantic tag 314; step S211, a contrast loss is calculated based on the text feature representation 311 of the sample text and the image feature representation of the sample image; step S213, one or more parameters of the text coding sub-model 310 is adjusted at least based on the first loss and the contrast loss; and step S215, one or more parameters of the image coding sub-model 320 is adjusted based on the contrast loss. The image-text retrieval model trained by using the method 200 retains semantic information of the text itself, and learn the relationship between the text and the image better.

The sample image 306 illustrated in FIG. 3 includes a positive sample image 302 that is matched with the sample text 301 and a negative sample image 303 that is not matched with the sample text 301, which enables the model to learn a matching relationship between the sample text 301 and the positive sample image 302 as well as a non-matching relationship between the sample text 301 and the negative sample image 303. It can be understood that, the model may be trained only by utilizing the positive sample image 302.

According to some embodiments of the present disclosure, at least one of the text coding sub-model 310 and the image coding sub-model 320 is a pre-training model.

In some embodiments, a large amount of corpus is used to train a pre-trained model before performing a target task, so that the pre-trained model can obtain semantic and grammatical information, thereby enhancing performance of the target task. In some embodiments, when the text coding sub-model 310 is a pre-trained model, the text coding sub-model 310 may be pre-trained through a large amount of corpus, so that the text coding sub-model 310 can obtain semantic information. In an image-text matching task of the embodiment of the present disclosure, fine-tuning is performed on the image-text matching model based on the first loss and the contrast loss, which can achieve retention of a semantic information perception capability of the text coding sub-model 310, and can improve a training speed and performance of the image-text matching model.

According to some embodiments of the present disclosure, the text coding sub-model 310 may, without limitation to, adopt a coding structure based on transformer and use a [cls] vector to represent overall representation of the text. A process is as follows: $v_{text}$=BERT (S), where s is the input sample text 301, BERT is the coding structure used by the text coding sub-model 310, and $v_{text}$ is the finally obtained text feature representation 311 of the sample text 301.

According to some embodiments of the present disclosure, the sample image 306 may be a single picture, or the sample image 306 may include a plurality of video frames of a sample video.

According to some embodiments of the present disclosure, in a video-text (video and text) matching task, the sample image includes a plurality of frames in the sample video, and the plurality of video frames of the sample video may be processed through the pre-trained image coding sub-model 320 (for example, a resnet model) to obtain a sequence $V_{video\_feature}$=Resnet([img 1, img2, ..., imgn]) of image features of the plurality of video frames, where img1, img2, ..., imgn represent a sequence of the plurality of video frames. Then a video aggregation model may be used to aggregate the abovementioned sequence of the image features of the plurality of video frames into a vector. A process is as follows: a vector $v_{video}$=Video_Encoder $(v_{video\_feature})$. The vector $v_{video}$ is the image feature representation of the sample image.

In step S201, the sample text 301 and the sample image 306 are obtained. In some embodiments, the obtained sample text 301 may be, for example, "a celebrity A and a celebrity B jointly participated in a program C", and the sample image 306 may include the plurality of video frames of the sample video. FIG. 3 only exemplarily illustrates one frame in a positive sample video and one frame in a negative sample video.

Step S203, the true semantic tag 304 of the sample text 301 is labeled according to the first preset rule.

According to some embodiments of the present disclosure, step S203 includes: mask labeling is performed on one or more target words in the sample text 301 to label each target word as a true semantic tag 304. To still take the sample text 301 "a celebrity A and a celebrity B jointly participated in a program C" as an example, mask labeling may be performed on "program C" in the sample text 301 "a celebrity A and a celebrity B jointly participated in a program C" to label "program C" as a true semantic tag 304.

Step S205, the sample text 301 is input into the text coding sub-model 310 to obtain the text feature representation 311 of the sample text 301 and the predicted semantic tag 314 output by the text coding sub-model 310.

To further take the sample text 301 "a celebrity A and a celebrity B jointly participated in a program C" as an example, a process of outputting the predicted semantic tag 314 is: according to "a celebrity A and a celebrity B jointly participated in a XXX", a word corresponding to a position "XXX" is predicted, where "XXX" represents a location of mask labeling, and the true semantic tag is known to be "program C". The model is trained to make the predicted semantic tag 314 output by the model to be the true semantic tag 304. By introducing semantic information perception training, the semantic information perception ability of the text coding sub-model 310 may be retained during the image-text matching training process, and will not be weakened by interference of image information, so that the relationship between the text and the image can be better learned.

Step S207, the sample image 306 is input into the image coding sub-model 320 so as to obtain the image feature representation of the sample image output by the image coding sub-model 320. According to some embodiments of the present disclosure, an image feature $v_{img}$ (i.e. the image feature representation of the sample image) may be represented through a feature vector.

Step S209, the first loss is calculated based on the true semantic tag 304 and the predicted semantic tag 314. According to some embodiments of the present disclosure, in the image-text matching model 310, the first loss may, for example, be: $Loss_1 = -\log p(t_i|S)$, where $t_i$ is the true semantic tag 304, for example, "program C" in the above example, S is a text masked with the true semantic tag 304 in the sample text 301, for example, "a celebrity A and a celebrity B jointly participated in a XXX" in the above image-text matching model, and $p(t_i|S)$ is a probability that the predicted semantic tag 314 output through the image-text matching model 310 and the true semantic tag 304 are the same under a condition that S is known. It can be seen from the formula that, the larger the probability $p(t_i|S)$ is, the smaller the first loss is. Therefore, by performing parameter adjustment on the image-text matching model 310 based on the first loss, the ability of the image-text matching model 310 in perceiving semantic information of the sample text 301 itself can be enhanced.

Step S211, the contrast loss is calculated based on the text feature representation 311 of the sample text and the image feature representation of the sample image.

According to some embodiments of the present disclosure, the sample image 306 includes the positive sample image 302 that is matched with the sample text 301 and the negative sample image 303 that is not matched with the sample text 301, and the image feature representation includes positive sample image feature representation 312 and negative sample image feature representation 313. Under this condition, calculating a contrast loss based on the text feature representation 311 of the sample text 301 and the image feature representation of the sample image includes: a contrast loss is calculated based on the text feature representation 311 of the sample text 301 as well as the positive sample image feature representation 312 and the negative sample image feature representation 313 of the sample image.

With further reference to FIG. 3, FIG. 3 illustrates a schematic diagram of one sample image 306 according to an embodiment of the present disclosure. The sample image 306 includes the positive sample image 302, and the positive sample image 302 is a poster picture of a variety show program "program C" and is an image that has been manually labeled to be matched with the sample text 301; and the sample image 306 further includes the negative sample image 303, and the negative sample image 303 is another picture and is an image that has been manually labeled to be not matched with the sample text 301.

According to some embodiments of the present disclosure, a similarity between the sample text 301 and the sample image may be measured by using cos similarity, so the similarity between the sample text 301 and the positive sample image 302 is $sim(v_{text}, v_{img})$=CosSimilarity$(v_{text}, v_{img})$, the similarity between the sample text 301 and the negative sample image 303 is $sim(v_{text}, v_{\bar{img}})$=CosSimilarity$(v_{text}, v_{\bar{img}})$, where the negative sample image 303 may be randomly selected, and the contrast loss is $Loss_{cl\_t2i}$=Max($|sim(v_{text}, v_{\bar{img}})-sim(v_{text}, v_{img})+a|$, 0), where a is a preset threshold and a is a positive integer. It can be seen from the formula of the contrast loss that, the model is trained to enable the similarity between the sample text 301 and the positive sample image 302 to be as large as possible, and to enable the similarity between the sample text 301 and the negative sample image 303 to be as small as possible.

According to other embodiments of the present disclosure, the sample text 301 includes a positive sample text that is matched with the sample image and a negative sample text that is not matched with the sample image, and the text feature representation 311 includes positive example text feature representation and negative example text feature representation. Under this condition, calculating a contrast function based on the text feature representation 311 of the sample text 301 and the image feature representation of the sample image includes: a contrast function is calculated based on the positive example text feature representation and the negative example text feature representation of the sample text 301 as well as the image feature representation of the sample image.

According to some embodiments of the present disclosure, a similarity between the sample image and a positive example of the sample text 301 is $sim(v_{img}, v_{text})=\text{CosSimilarity}(v_{img}, v_{\bar{text}})$, a similarity between the sample image and the negative sample text is $sim(v_{img}, v_{\bar{text}})=\text{CosSimilarity}(v_{img}, v_{\bar{text}})$ and the contrast loss is $\text{Loss}_{cl\_i2t}=\text{Max}(|sim(v_{img}, v_{\bar{text}})-sim(v_{img}, v_{text})+a|, 0)$, where a is the preset threshold and a is a positive integer. It can be seen from the formula of the contrast loss that, the model is trained to enable the similarity between the sample image and the positive sample text to be as larger as possible, and to enable the similarity between the sample image and the negative sample text to be as small as possible.

According to another embodiment of the present disclosure, for a certain pair of sample text 301 and positive sample image 302, the positive sample image 302 that is matched with the sample text 301 and the negative sample image 303 that is not matched with the sample text 301 may be obtained based on the sample text 301 so as to obtain the contrast loss $\text{Loss}_{cl\_t2i}=\text{Max}(|sim(v_{text}, v_{\bar{img}})-sim(v_{text}, v_{img})+a|, 0)$. Meanwhile, the positive sample text that is matched with the sample image and the negative sample text that is not matched with the sample image are obtained based on the positive example image 302 so as to obtain the contrast loss $\text{Loss}_{cl\_i2t}=\text{Max}(-sim(v_{img}, v_{\bar{text}})-sim(v_{img}, v_{text})+a|, 0)$.

According to some embodiments, the above two technical solutions may be combined to calculate a total contrast loss $\text{Loss}_{cl}=\text{Loss}_{cl\_t2i}+\text{Loss}_{cl\_i2t}$, and to perform parameter adjustment based on the total contrast loss. It can be seen from the formulas of the contrast loss that, model training can realize that the similarity of the sample image to the positive sample text is as large as possible while the similarity to the negative sample text is as small as possible and that the similarity of the sample text to the positive sample image 302 is as large as possible while the similarity to the negative sample image 303 is as small as possible.

Step S213, the parameter of the text coding sub-model 310 is adjusted at least based on the first loss and the contrast loss.

Step S215, a parameter of the image coding sub-model 320 is adjusted based on the contrast loss.

Adjusting the parameter of the text coding sub-model 310 based on the first loss may enable the text coding sub-model 310 to retain text semantics. Adjusting the parameter of the text coding sub-model 310 and the parameter of the image coding sub-model 320 based on the contrast loss may enable a similarity between the text feature representation 311 of the sample text output by the text coding sub-model 310 and the image feature representation 312 of the positive sample image output by the image coding sub-model 320 to be larger.

According to some embodiments of the present disclosure, output of the text coding sub-model 310 further includes a predicted attribute tag 315, and the method further includes: a true attribute tag 305 of the sample text 301 is labeled according to a second preset rule; and a second loss is calculated based on the true attribute tag 305 and the predicted attribute tag 315. Specifically, adjusting a parameter of the text coding sub-model 310 at least based on the first loss and the contrast loss includes: a parameter of the text coding sub-model 310 is adjusted based on the first loss, the second loss and the contrast loss.

According to some embodiments of the present disclosure, labeling a true attribute tag 305 of the sample text 301 according to a second preset rule includes: a true attribute tag 305 of at least one entity word in the sample text 301 is labeled.

According to some embodiments of the present disclosure, true attribute tags 305 of a plurality of entity words in the sample text 301 may also be labeled simultaneously and prediction may be performed on the plurality of true attribute tags 305. In this way, through one sample text 301, the text coding sub-model 310 may be enabled to repeatedly obtain attribute information of the entity words themselves, thus further enhancing an effect of the image-text matching model.

For example, with further reference to FIG. 3, a true attribute tag 305 of "celebrity A" in the sample text 301 "a celebrity A and a celebrity B jointly participated in a program C" is "actor". According to some embodiments of the present disclosure, a process of outputting a predicted attribute tag 315 is: a career attribute tag of "celebrity A" is predicted according to "a celebrity A and a celebrity B jointly participated in a program C".

In some embodiments the second loss may be but is not limited to $\text{Loss}_2=-\log p(attr_i|S, t_i)$, where $attr_i$ is a true value of $t_i$ attribute predicted by the text coding sub-model 310 after the sample text 301 S is given, i.e. the predicted attribute tag 315. Through adding the second loss, the parameter of the text coding sub-model 310 is adjusted, which may enable the text coding sub-model 310 to obtain the attribute information of the words themselves, enhance semantic and grammatical information of the text coding sub-model 310, and enable the model to better learn an association relationship between images and texts.

Figure 4:
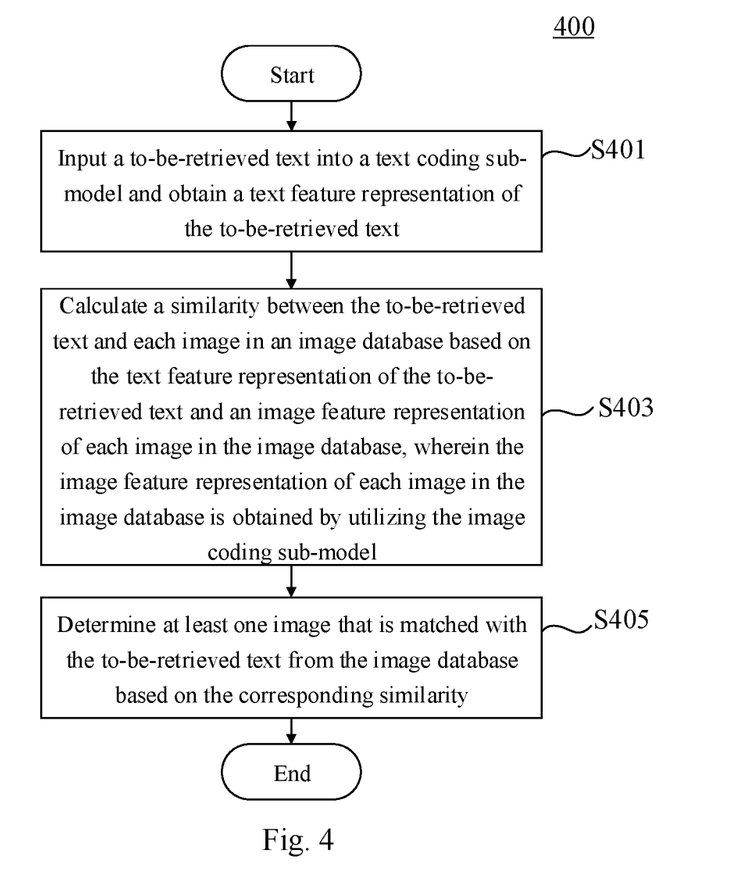
FIG. 4 illustrates a flow chart of a method for realizing image-text retrieval by utilizing an image-text matching model according to some embodiments of the present disclosure.

According to another aspect of the present disclosure, a method 400 for realizing image-text retrieval by utilizing the image-text matching model obtained by training through using the above method 200 is further provided. The image-text matching model includes a text coding sub-model and an image coding sub-model, as shown in FIG. 4. The method 400 includes: step S401, a to-be-retrieved text is input into the text coding sub-model so as to obtain text feature representation of the to-be-retrieved text output by the text coding sub-model; step S403, a similarity between the to-be-retrieved text and each image in an image database is calculated based on the text feature representation of the to-be-retrieved text and an image feature representation of the each image in the image database, wherein the image feature representation of the each image in the image database is obtained by utilizing the image coding sub-model; and step S405, at least one image that is matched with the to-be-retrieved text is determined from the image database based on the corresponding similarity.

By utilizing the image-text retrieval method in the embodiment of the present disclosure, an effect and accuracy of image-text matching can be improved.

Figure 5:
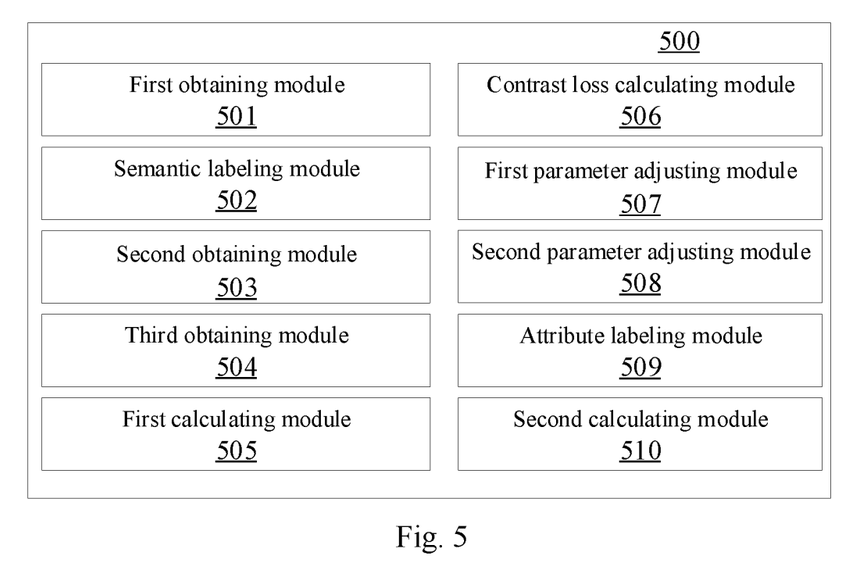
FIG. 5 illustrates a structural block diagram of an apparatus for training an image-text matching model according to some embodiments of the present disclosure.

According to another aspect of the present disclosure, an apparatus 500 for training an image-text matching model is further provided. The image-text matching model includes a text coding sub-model and an image coding sub-model. FIG. 5 illustrates a structural block diagram of an apparatus 500 for training an image-text matching model according to an embodiment of the present disclosure. As shown in FIG. 5, the apparatus 500 includes a first obtaining module 501, a semantic labeling module 502, a second obtaining module 503, a third obtaining module 504, a first calculating module 505, a contrast loss calculating module 506, a first parameter adjusting module 507, and a second parameter adjusting module 508.

The first obtaining module 501 is configured to obtain a sample text and a sample image corresponding to the sample text.

The semantic labeling module 502 is configured to label a true semantic tag for the sample text according to a first preset rule.

The second obtaining module 503 is configured to input the sample text into the text coding sub-model, and obtain a text feature representation of the sample text and a predicted semantic tag output by the text coding sub-model.

The third obtaining module 504 is configured to input the sample image into the image coding sub-model, and obtain an image feature representation of the sample image output by the image coding sub-model.

The first calculating module 505 is configured to calculate a first loss based on the true semantic tag and the predicted semantic tag.

The contrast loss calculating module 506 is configured to calculate a contrast loss based on the text feature representation of the sample text and the image feature representation of the sample image.

The first parameter adjusting module 507 is configured to adjust one or more parameters of the text coding sub-model at least based on the first loss and the contrast loss.

The second parameter adjusting module 508 is configured to adjust one or more parameters of the image coding sub-model based on the contrast loss.

According to some embodiments of the present disclosure, output of the text coding sub-model further includes a predicted attribute tag, and the apparatus further includes an attribute labeling module 509 and a second calculating module 510.

The attribute labeling module 509 is configured to label a true attribute tag for the sample text according to a second preset rule.

The second calculating module 510 is configured to calculate a second loss based on the true attribute tag and the predicted attribute tag, wherein the first parameter adjusting module is configured to adjust the parameters of the text coding sub-model based on the first loss, the second loss and the contrast loss.

According to some embodiments of the present disclosure, the attribute labeling module 509 is configured to label a true attribute tag of at least one entity word in the sample text.

According to some embodiments of the present disclosure, the semantic labeling module 502 is configured to perform mask labeling on one or more target words in the sample text so as to label each target word as a true semantic tag, wherein the target word is matched with the sample image.

According to some embodiments of the present disclosure, the sample image includes a positive sample image that is matched with the sample text and a negative sample image that is not matched with the sample text, and the image feature representation includes positive sample image feature representation and negative sample image feature representation, wherein the contrast loss calculating module 506 is configured to calculate the contrast loss based on the text feature representation of the sample text as well as the positive sample image feature representation and the negative sample image feature representation of the sample image.

According to some embodiments of the present disclosure, the sample text includes a positive sample text that is matched with the sample image and a negative sample text that is not matched with the sample image, and the text feature representation includes text positive example feature representation and text negative example feature representation, wherein the contrast loss calculating module 506 is configured to calculate the contrast loss based on the text positive example feature representation and the text negative example feature representation of the sample text as well as the image feature representation of the sample image.

Figure 6:
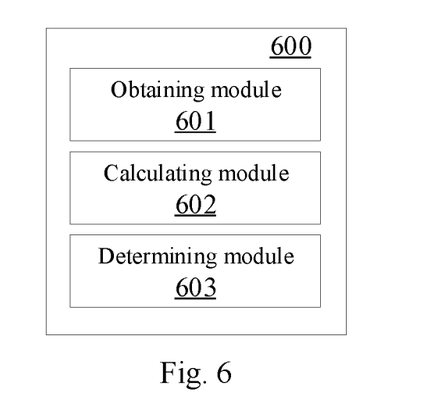
FIG. 6 illustrates a structural block diagram of an apparatus for realizing image-text retrieval by utilizing an image-text matching model according to some embodiments of the present disclosure.

According to another aspect of the present disclosure, an apparatus 600 for realizing image-text retrieval by utilizing an image-text matching model obtained by training through the abovementioned training method is further provided. FIG. 6 illustrates a structural block diagram of an apparatus 600 for realizing image-text retrieval by utilizing an image-text matching model according to an embodiment of the present disclosure. The image-text matching model includes a text coding sub-model and an image coding sub-model. As shown in FIG. 6, the apparatus 600 includes an obtaining module 601, a calculating module 602, and a determining module 603.

The obtaining module 601 is configured to input a to-be-retrieved text into the text coding sub-model, and obtain text feature representation of the to-be-retrieved text output by the text coding sub-model.

The calculating module 602 is configured to calculate a similarity between the to-be-retrieved text and each image in an image database based on the text feature representation of the to-be-retrieved text and an image feature representation of each image in the image database, wherein the image feature representation of the each image in the image database is obtained by utilizing the image coding sub-model.

The determining module 603 is configured to determine at least one image that is matched with the to-be-retrieved text from the image database based on the corresponding similarity.

According to another aspect of the present disclosure, an electronic device is further provided, and includes: at least one processor; and a memory in communication connection with the at least one processor, wherein the memory stores an instruction executable by the at least one processor, and the instruction is executed by the at least one processor so as to enable the at least one processor to execute the abovementioned method.

According to another aspect of the present disclosure, a non-transitory computer readable storage medium storing a computer instruction is further provided, wherein the computer instruction is used for enabling a computer to execute the abovementioned method.

According to another aspect of the present disclosure, a computer program product is further provided, and includes a computer program, wherein the computer program, when executed by a processor, implements the abovementioned method.

In the technical solution of the present disclosure, collection, storage, use, processing, transmission, provision and disclosure of the user's personal information involved are all in compliance with stipulations of relevant laws and regulations, and do not violate public order and good customs.

Figure 7:
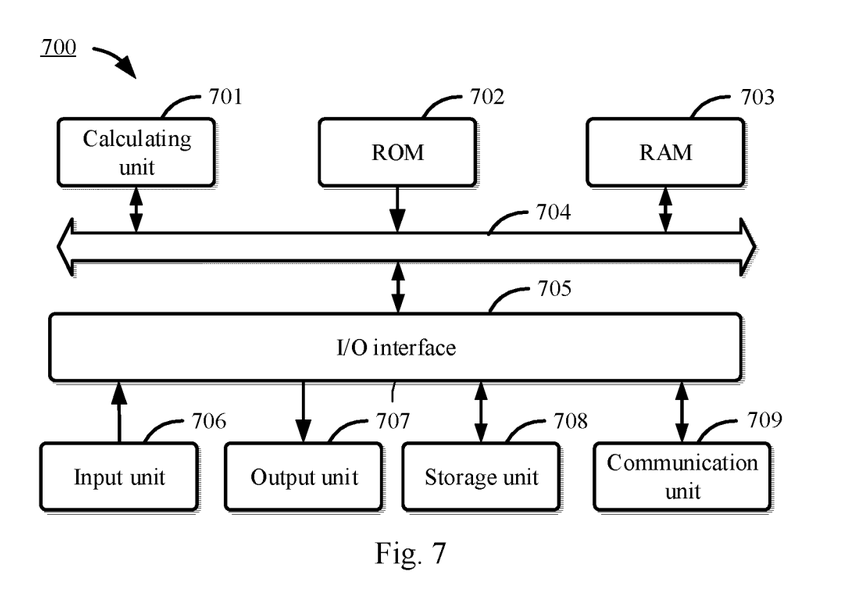
FIG. 7 illustrates a structural block diagram of an exemplary electronic device that can be used for realizing some embodiments the present disclosure.

With reference to FIG. 7, a structural block diagram of an electronic device 700 that can serve as a server or a client of the present disclosure will be now described. The electronic device is an example of hardware devices that can be applied to various aspects of the present disclosure. The electronic device is intended to represent various forms of digital electronic computer devices, such as laptop computers, desktop computers, workstations, personal digital assistants, servers, blade servers, mainframe computers, and other suitable computers. The electronic device may also represent various forms of mobile devices, such as personal digital processors, cellular phones, smart phones, wearable devices, and other similar computing devices. Components shown herein, their connections and relationships, and their functions are exemplary only, and are not intended to limit implementations of the present disclosure described and/or claimed herein.

As shown in FIG. 7, the device 700 includes a computing unit 701, which may execute various appropriate actions and processing according to a computer program stored in a read-only memory (ROM) 702 or a computer program loaded to a random access memory (RAM) 703 from a storage unit 708. In the RAM 703, various programs and data needed for operations of the device 700 may be further stored. The computing unit 701, the ROM 702 and the RAM 703 are mutually connected through a bus 704. An input/output (I/O) interface 705 is also connected to the bus 704.

A plurality of components in the device 700 are connected to the I/O interface 705, including: an input unit 706, an output unit 707, the storage unit 708 and a communication unit 709. The input unit 706 may be any type of device capable of inputting information to the device 700. The input unit 706 may receive input number or character information and generate key signal input related to a user setting and/or function control of the electronic device and may include but is not limited to a mouse, a keyboard, a touch screen, a trackpad, a trackball, a joystick, a microphone and/or a remote-control unit. The output unit 707 may be any type of device capable of displaying information and may include but is not limited to a display, a speaker, a video/audio output terminal, a vibrator and/or a printer. The storage unit 708 may include but is not limited to a magnetic disk and a compact disc. The communication unit 709 may allow the device 700 to exchange information/data with other devices through a computer network, such as the Internet and/or various telecommunication networks, and may include but is not limited to a modem, a network card, an infrared communication device, a wireless communication transceiver and/or a chipset, for example, a Bluetooth™ device, a 1302.11 device, a WiFi device, a WiMax device, a cellular communication device and/or similar items.

The computing unit 701 may be various general-purpose and/or special-purpose processing components with processing and computing capacity. Some examples of the computing unit 701 include but are not limited to a central processing unit (CPU), a graphics processing unit (GPU), various special-purpose artificial intelligence (AI) computing chips, various computing units for running a machine learning model algorithm, a digital signal processor (DSP), and any appropriate processor, controller, microcontroller and the like. The computing unit 701 executes each method and processing described above, for example, the method 200 or the method 400. For example, in some embodiments, the method 200 or the method 400 may be realized as a computer software program, which is tangibly contained in a machine readable medium, for example, the storage unit 708. In some embodiments, a part of or all of the computer program may be loaded and/or installed onto the device 700 via the ROM 702 and/or the communication unit 709. When the computer program is loaded to the RAM 703 and is executed by the computing unit 701, one or more steps of the method 200 or the method 400 described above can be executed. Alternatively, in other embodiments, the computing unit 701 may be configured to execute the method 200 or the method 400 in any other appropriate mode (for example, by means of firmware).

Various implementations of the systems and technologies described above in this paper may be implemented in a digital electronic circuit system, an integrated circuit system, a field programmable gate array (FPGA), an application specific integrated circuit (ASIC), an application specific standard part (ASSP), a system on chip (SOC), a load programmable logic device (CPLD), computer hardware, firmware, software and/or their combinations. These various implementations may include: being implemented in one or more computer programs, wherein the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents. More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with users, the systems and techniques described herein may be implemented on a computer, and the computer has: a display apparatus for displaying information to the users (e.g., a CRT (cathode ray tube) or LCD (liquid crystal display) monitor); and a keyboard and a pointing device (e.g., a mouse or trackball), through which the users may provide input to the computer. Other types of apparatuses may further be used to provide interactions with users; for example, feedback provided to the users may be any form of sensory feedback (e.g., visual feedback, auditory feedback, or tactile feedback); an input from the users may be received in any form (including acoustic input, voice input or tactile input).

The systems and techniques described herein may be implemented in a computing system including background components (e.g., as a data server), or a computing system including middleware components (e.g., an application server) or a computing system including front-end components (e.g., a user computer with a graphical user interface or a web browser through which a user may interact with the implementations of the systems and technologies described herein), or a computing system including any combination of such background components, middleware components, or front-end components. The components of the system may be interconnected by digital data communication (e.g., a communication network) in any form or medium. Examples of the communication network include: a local area network (LAN), a wide area network (WAN) and the Internet.

A computer system may include a client and a server. The client and the server are generally away from each other and usually interact through a communication network. A relation between the client and the server is generated by running a computer program with a mutual client-server relation on a corresponding computer. The server may be a cloud server, or a server of a distributed system, or a server combined with a blockchain.

It should be understood that steps can be reranked, added or deleted by using various forms of flows shown above. For example, all the steps recorded in the present disclosure can be executed in parallel, or in sequence or in different orders. As long as a desired result of the technical solutions disclosed by the present disclosure can be realized, no limitation is made herein.

Though the embodiments or the examples of the present disclosure are already described with reference to the drawings, it should be understood that the above method, system or device is only an exemplary embodiment or example, and the scope of present disclosure is not limited by these embodiments or examples but is limited only by the scope of the authorized claims and their equivalents. Various elements in the embodiments or the examples may be omitted or replaced by their equivalent elements. Besides, all the steps may be executed in sequence different from a sequence described in the present disclosure. Furthermore, various elements in the embodiments or the examples may be combined in various modes. What counts is that with technology evolution, many elements described here can be replaced by equivalent elements appearing after the present disclosure.

What is claimed is:

1. A computer-implemented method, comprising:
    obtaining a sample text and a sample image corresponding to the sample text;
    labeling a true semantic tag for the sample text according to a first preset rule;
    inputting the sample text into a text coding sub-model of an image-text matching model, and obtaining a text feature representation of the sample text and a predicted semantic tag output by the text coding sub-model, wherein an output of the text coding sub-model further comprises a predicted attribute tag;
    inputting the sample image into an image coding sub-model of the image-text matching model, and obtaining an image feature representation of the sample image output by the image coding sub-model;
    calculating a first loss based on the true semantic tag and the predicted semantic tag;
    calculating a contrast loss based on the text feature representation of the sample text and the image feature representation of the sample image;
    labeling a true attribute tag for the sample text according to a second preset rule;
    calculating a second loss based on the true attribute tag and the predicted attribute tag;
    adjusting one or more parameters of the text coding sub-model based on the first loss, the second loss, and the contrast loss; and
    adjusting one or more parameters of the image coding sub-model based on the contrast loss.

2. The method according to claim 1, wherein the labeling the true attribute tag of the sample text according to the second preset rule comprises:
    labeling a corresponding true attribute tag for each entity word of one or more entity words in the sample text.

3. The method according to claim 1, wherein at least one of the text coding sub-model or the image coding sub-model is a pre-trained model.

4. The method according to claim 1, wherein the labeling the true semantic tag for the sample text according to the first preset rule comprises:
    performing mask labeling on one or more target words in the sample text and labeling each target word of the one or more target words as a true semantic tag.

5. The method according to claim 1, wherein the sample image comprises a positive sample image that is matched with the sample text and a negative sample image that is not matched with the sample text, and the image feature representation comprises a positive sample image feature representation and a negative sample image feature representation;
    wherein the calculating the contrast loss based on the text feature representation of the sample text and the image feature representation of the sample image comprises:
        calculating the contrast loss based on the text feature representation of the sample text, the positive sample image feature representation, and the negative sample image feature representation of the sample image.

6. The method according to claim 1, wherein the sample text comprises a positive sample text that is matched with the sample image and a negative sample text that is not matched with the sample image, and the text feature representation comprises a positive sample text feature representation and a negative sample text feature representation;

wherein the calculating the contrast loss based on the text feature representation of the sample text and the image feature representation of the sample image comprises:
calculating the contrast loss based on the positive sample text feature representation, the negative sample text feature representation of the sample text, and the image feature representation of the sample image.

7. The method according to claim 1, wherein the sample image is a single picture, or the sample image comprises a plurality of video frames of a sample video.

8. The method according to claim 1, wherein the image-text matching model that is trained is used to perform operations comprising:
inputting a to-be-retrieved text into the text coding sub-model, and obtaining a text feature representation of the to-be-retrieved text output by the text coding sub-model;
calculating a similarity between the to-be-retrieved text and each image in an image database based on the text feature representation of the to-be-retrieved text and an image feature representation of the each image in the image database, wherein the image feature representation of the each image in the image database is obtained by utilizing the image coding sub-model; and
determining at least one image that is matched with the to-be-retrieved text from the image database based on the corresponding similarity.

9. A computing device, comprising:
one or more processors; and
a memory storing one or more programs configured to be executed by the one or more processors, the one or more programs comprising instructions for performing operations comprising:
obtaining a sample text and a sample image corresponding to the sample text;
labeling a true semantic tag for the sample text according to a first preset rule;
inputting the sample text into a text coding sub-model of an image-text matching model, and obtaining a text feature representation of the sample text and a predicted semantic tag output by the text coding sub-model, wherein an output of the text coding sub-model further comprises a predicted attribute tag;
inputting the sample image into an image coding sub-model of the image-text matching model, and obtaining an image feature representation of the sample image output by the image coding sub-model;
calculating a first loss based on the true semantic tag and the predicted semantic tag;
calculating a contrast loss based on the text feature representation of the sample text and the image feature representation of the sample image;
labeling a true attribute tag for the sample text according to a second preset rule;
calculating a second loss based on the true attribute tag and the predicted attribute tag;
adjusting one or more parameters of the text coding sub-model based on the first loss, the second loss, and the contrast loss; and
adjusting one or more parameters of the image coding sub-model based on the contrast loss.

10. The computing device according to claim 9, wherein the labeling the true attribute tag of the sample text according to the second preset rule comprises:
labeling a corresponding true attribute tag for each entity word of one or more entity words in the sample text.

11. The computing device according to claim 9, wherein at least one of the text coding sub-model or the image coding sub-model is a pre-trained model.

12. The computing device according to claim 9, wherein the labeling the true semantic tag for the sample text according to the first preset rule comprises:
performing mask labeling on one or more target words in the sample text and labeling each target word of the one or more target words as a true semantic tag.

13. The computing device according to claim 9, wherein the sample image comprises a positive sample image that is matched with the sample text and a negative sample image that is not matched with the sample text, and the image feature representation comprises a positive sample image feature representation and a negative sample image feature representation;
wherein the calculating the contrast loss based on the text feature representation of the sample text and the image feature representation of the sample image comprises:
calculating the contrast loss based on the text feature representation of the sample text, the positive sample image feature representation, and the negative sample image feature representation of the sample image.

14. The computing device according to claim 9, wherein the sample text comprises a positive sample text that is matched with the sample image and a negative sample text that is not matched with the sample image, and the text feature representation comprises a positive sample text feature representation and a negative sample text feature representation;
wherein the calculating the contrast loss based on the text feature representation of the sample text and the image feature representation of the sample image comprises:
calculating the contrast loss based on the positive sample text feature representation, the negative sample text feature representation of the sample text, and the image feature representation of the sample image.

15. The computing device according to claim 9, wherein the sample image is a single picture, or the sample image comprises a plurality of video frames of a sample video.

16. The computing device according to claim 9, wherein the image-text matching model that is trained is used to perform operations comprising:
inputting a to-be-retrieved text into the text coding sub-model, and obtaining a text feature representation of the to-be-retrieved text output by the text coding sub-model;
calculating a similarity between the to-be-retrieved text and each image in an image database based on the text feature representation of the to-be-retrieved text and an image feature representation of the each image in the image database, wherein the image feature representation of the each image in the image database is obtained by utilizing the image coding sub-model; and
determining at least one image that is matched with the to-be-retrieved text from the image database based on the corresponding similarity.

17. A non-transitory computer readable storage medium storing one or more programs comprising instructions that, when executed by one or more processors of a computing device, cause the computing device to perform operations comprising:

obtaining a sample text and a sample image corresponding to the sample text;
labeling a true semantic tag for the sample text according to a first preset rule;
inputting the sample text into a text coding sub-model of an image-text matching model, and obtaining a text feature representation of the sample text and a predicted semantic tag output by the text coding sub-model, wherein an output of the text coding sub-model further comprises a predicted attribute tag;
inputting the sample image into an image coding sub-model of the image-text matching model, and obtaining an image feature representation of the sample image output by the image coding sub-model;
calculating a first loss based on the true semantic tag and the predicted semantic tag;
calculating a contrast loss based on the text feature representation of the sample text and the image feature representation of the sample image;
labeling a true attribute tag for the sample text according to a second preset rule:
calculating a second loss based on the true attribute tag and the predicted attribute tag;
adjusting one or more parameters of the text coding sub-model based on the first loss, the second loss, and the contrast loss; and
adjusting one or more parameters of the image coding sub-model based on the contrast loss.

* * * * *